(12) United States Patent
Nunnink et al.

(10) Patent No.: US 9,467,604 B2
(45) Date of Patent: Oct. 11, 2016

(54) METHOD AND APPARATUS FOR CALIBRATING A CAMERA LENS FLANGE TO SENSOR DISTANCE

(71) Applicants: Laurens Nunnink, Simpelveld (NL); Michael Haardt, Titz (DE); Rene Delasauce, Aachen (DE)

(72) Inventors: Laurens Nunnink, Simpelveld (NL); Michael Haardt, Titz (DE); Rene Delasauce, Aachen (DE)

(73) Assignee: Cognex Corporation, Natick, MA (US)

(*) Notice: Subject to any disclaimer, the term of this patent is extended or adjusted under 35 U.S.C. 154(b) by 0 days.

(21) Appl. No.: 13/691,942

(22) Filed: Dec. 3, 2012

(65) Prior Publication Data

US 2014/0152885 A1 Jun. 5, 2014

(51) Int. Cl.
| | |
|---|---|
| H04N 5/225 | (2006.01) |
| H04N 5/232 | (2006.01) |
| G02B 26/00 | (2006.01) |
| G02B 1/00 | (2006.01) |
| G02B 13/00 | (2006.01) |
| G02B 1/06 | (2006.01) |

(52) U.S. Cl.
CPC ............. *H04N 5/2254* (2013.01); *G02B 1/06* (2013.01); *G02B 13/0075* (2013.01); *G02B 26/004* (2013.01); *H04N 5/23209* (2013.01)

(58) Field of Classification Search
CPC ........ G02B 3/12; G02B 3/14; G02B 26/004; G02B 26/005; G02B 1/06; G02B 13/0075
USPC ........ 359/665, 642, 666; 348/335, 340, 345, 348/348–351, 353–357
See application file for complete search history.

(56) References Cited

U.S. PATENT DOCUMENTS

| | | | |
|---|---|---|---|
| 3,619,067 A | 11/1971 | Howland et al. | |
| 5,583,602 A | 12/1996 | Yamamoto | |

(Continued)

FOREIGN PATENT DOCUMENTS

| | | |
|---|---|---|
| JP | H11-64956 A | 3/1999 |
| JP | 20026194 A | 1/2002 |

(Continued)

OTHER PUBLICATIONS

JP2008035130 English Abstract.

(Continued)

*Primary Examiner* — Mark Monk
(74) *Attorney, Agent, or Firm* — Quarles & Brady LLP

(57) ABSTRACT

A method and camera assembly for use in a machine vision system, the assembly comprising a support structure forming a mounting flange that is configured for coupling with any of a plurality of exchangeable electrically controllable adjustable focal length lens assemblies, a two dimensional image sensor supported by the support structure and forming a sensor plane spaced from the mounting flange by a flange focal distance and a processor programmed with a flange focal distance error and to use the flange focal distance error to generate lens control signals to compensate for the flange focal distance error when a lens is mounted to the mounting flange.

24 Claims, 6 Drawing Sheets

(56) References Cited

U.S. PATENT DOCUMENTS

| | | |
|---|---|---|
| 6,363,220 B1 | 3/2002 | Ide |
| 6,587,210 B2 | 7/2003 | Marcus et al. |
| 6,836,135 B2 | 12/2004 | Harris et al. |
| 7,466,493 B2 * | 12/2008 | Kim et al. .................... 359/666 |
| 2005/0140815 A1 * | 6/2005 | Nakano et al. ............... 348/345 |
| 2008/0198257 A1 * | 8/2008 | Morimoto .................... 348/345 |
| 2010/0040355 A1 | 2/2010 | Craen et al. |
| 2010/0208122 A1 * | 8/2010 | Yumiki .................... 348/333.08 |
| 2011/0037832 A1 * | 2/2011 | Gharib et al. ................. 348/46 |
| 2012/0044407 A1 | 2/2012 | Murashima |

FOREIGN PATENT DOCUMENTS

| | | |
|---|---|---|
| JP | 2007-248585 A | 9/2007 |
| JP | 2008035130 | 2/2008 |
| JP | 2012230206 | 11/2012 |

OTHER PUBLICATIONS

JP2012230206 English Abstract.
European Search Report dated Jul. 31, 2015 from EP Application No. 13195092.5, 7 pages.

* cited by examiner

METHOD AND APPARATUS FOR CALIBRATING A CAMERA LENS FLANGE TO SENSOR DISTANCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to calibration of imaging systems and more specifically to calibration to compensate for a flange focal distance error due to manufacturing tolerances.

The machine vision industry has developed digital camera systems for obtaining high quality images used for code identification and decoding as well as for vision inspection systems. A digital camera typically includes a two dimensional CMOS or CCD sensor array, a lens assembly, a lens mounting flange and a camera processor. The lens assembly attaches to the lens mounting flange which is supposed to position the lens assembly at a specific distance from the sensor. For instance, in the case of a C-mount camera, a specified distance between the mounting flange and the sensor plane is 17.526 millimeters. Similarly, in the case of a CS-mount camera, a specified distance between the mounting flange and the sensor plane is 12.5 millimeters. The processor is programmed to control the lens in a manner calculated to control the focal distance of the camera where control characteristics are based at least in part on the specified distance between the mounting flange and the sensor array.

One type of lens assembly is a motorized lens type wherein a motor is used to move lens components along an optical axis to adjust focal distance. Another type of lens assembly is a variable optical power type assembly such as a liquid lens where, instead of moving the lens along the optical axis to adjust the focal distance, the shape of the lens is modified to adjust the distance. To control a motorized lens, the processor adjusts control signals to the lens to drive a lens motor to modify the focal distance. To control a liquid lens, the processor adjusts a voltage applied to the lens to change the shape of the lens thereby adjusting the focal distance.

Some camera systems have been developed that can be used with many different types of lenses. Where several different types of liquid lenses may be used with a single camera assembly, the different lenses typically have different lens specific operating characteristics that are stored in a memory device mounted to the lens that, among other things, can be used to calculate how the processor is to control the lens to adjust focal distance. When a liquid lens is attached to the mounting flange, the processor reads the operating characteristics from the lens memory device and thereafter controls the lens in a manner consistent with the operating characteristics and the camera mount type (e.g., C-mount, CS-mount, other). For instance, the operating characteristics and characteristics of a specific camera mount type may be useable to calculate a voltage to apply to the lens to control the shape of the lens and cause a specific optical power to occur.

One problem with existing CCD or CMOS based camera systems is that manufacturing tolerances related to the CCD or CMOS sensor array often result in a flange focal distance error which in turn causes a focal distance error. For example, a CCD sensor array includes a CCD array mounted on a printed circuit board which is then mounted within a system support structure. The thickness of the PCB and array can vary appreciably and result in a flange focal distance error (i.e., a deviation from the specified or ideal flange focal distance for a specific lens type). Tolerance in the position of a sensor die in its package also contributes appreciably to the flange focal distance error. It has been empirically determined that the flange focal distance error can result in a focusing error that is greater than the depth of field in certain vision applications such that the error substantially impacts performance of an overall system.

One solution to the problems associated with the flange focal distance error is to factory calibrate the combination of a sensor array (e.g., a CCD array) and a specific lens (e.g., a liquid lens of a specific type) prior to shipping the combination. While this solution works well in cases where only the factory installed lens will be used with a sensor array, this solution does not allow other lenses with varying capabilities to be swapped for the factory installed lens.

Another solution is to integrate a calibration target into a camera assembly at a known distance from the sensor array or into an application environment at a known distance from the sensor array and program the system to recalibrate itself each time the assembly is booted up during a commissioning procedure. A similar solution is to field calibrate a sensor array and lens combination with a target placed a known distance from the sensor array after the system is installed. Either of these solutions, unfortunately, require additional commissioning procedure steps. In addition, these solutions include processes that must be repeated every time one type of lens is swapped for a different type of lens.

Another solution to the problems associated with the flange focal distance error would be to provide a mechanical adjustment mechanism for adjusting the flange focal distance between the mounting flange and the sensor plane after manufacture to compensate for or eliminate the focal distance error. This solution, while possible, would require an extremely precise mechanical adjustment assembly and therefore would require additional system components and would increase overall cost.

One other solution is to design a closed loop autofocus system where a sequence of images are obtained and the system adjusts the lens to set an optimal focal distance based on measured image sharpness. This solution does not work well in fast moving applications where there is insufficient time to analyze a series of images and adjust focus between each obtained image to hunt for a focused setting.

Thus, it would be advantageous to have a camera system that could automatically compensate for flange focal distance error regardless of the type of lens used with the system.

BRIEF SUMMARY OF THE INVENTION

It has been recognized that the flange focal distance error for a specific sensor/flange assembly can be measured after manufacture and stored in a memory device physically associated with the sensor/flange assembly. Then, when a lens is mounted to a mounting flange, the system processor may be programmed to automatically adjust the lens to compensate for the flange focal distance error. For instance, where the flange focal distance error on a C-mount sensor/ flange assembly is 250 microns short (i.e., 250 microns less than the specified 17.526 millimeters), the processor can be programmed to automatically drive the lens in a motorized lens assembly 250 microns in the opposite direction to extend the sensor to lens distance by 250 microns thereby eliminating the error.

In the case of a variable optical power lens such as a liquid lens, the amount of optical power required to compensate for a flange focal distance error depends on the effective focal length of the lens. In many cases the effective focal length of a lens is stored as a lens operating parameter in a lens memory. When a lens is mounted to a camera, the effective focal length value can be used by a camera processor along with the flange focal distance error value to identify an optical power required to compensate for the error. The optical power can be signaled to a lens driver causing the driver to control a voltage on the lens to change lens shape and achiever the optical power required to compensate for the error.

Consistent with the above comments, at least some inventive embodiments include a camera assembly for use in a machine vision system, the assembly comprising a support structure forming a mounting flange that is configured for coupling with any of a plurality of exchangeable electrically controllable adjustable focal length lens assemblies, a two dimensional image sensor supported by the support structure and forming a two dimensional sensor plane spaced from the mounting flange by a flange focal distance and a processor programmed during a commissioning procedure prior to normal operation with a flange focal distance error and to use the flange focal distance error to generate lens control signals to compensate for the flange focal distance error when a lens is mounted to the mounting flange wherein the flange focal distance error is the difference between an ideal flange focal distance and the flange focal distance.

Some embodiments further include a memory supported by the support structure and storing a flange focal distance error prior to normal operation of the assembly and for use thereafter with multiple adjustable focal length lens assemblies. In some cases the flange focal distance error is determined using a first lens assembly during the commissioning procedure and is thereafter used during normal operation with at least a second lens assembly.

In some cases the processor is supported by the support structure that forms the mounting flange. Some embodiments further include electrical contacts adjacent the mounting flange and linked to the processor, the contacts for linking to contacts on a lens assembly when the lens assembly is mounted to the mounting flange to provide the lens control signals to the lens assembly. In some cases the processor is further programmed to, when a lens assembly is mounted to the mounting flange, obtain lens characteristics from the lens assembly and use the lens characteristics to generate the lens control signals to compensate for the flange focal distance error. In some cases the lens includes a fixed glass imager lens and a liquid lens. In some cases the lens characteristics include an effective focal length of the imager lens.

Some embodiments further include a distance determiner for determining a target distance from the camera to a target to be imaged, the processor further programmed to use the target distance to generate the lens control signals to compensate for the flange focal distance error. In some cases the lens assembly is a motorized lens assembly and the control signals cause the lens assembly to adjust by an amount equal to the flange focal distance error. In some cases the flange focal distance error is coded into software run by the processor to generate the lens control signals.

Other embodiments include a camera assembly for use in a machine vision system, the assembly comprising a support structure forming a mounting flange that is configured for coupling with any of a plurality of exchangeable electrically controllable adjustable focal length lens assemblies, a two dimensional image sensor supported by the support structure and forming a two dimensional sensor plane spaced from the mounting flange by a flange focal distance, a memory supported by the support structure and storing a flange focal distance error prior to normal operation of the assembly and for use thereafter with multiple adjustable focal length lens assemblies wherein the flange focal distance error is the difference between an ideal flange focal distance and the flange focal distance and a processor supported by the support structure and programmed to obtain the flange focal distance error from the memory and use the flange focal distance error to generate lens control signals to compensate for the flange focal distance error when a lens is mounted to the mounting flange.

In some cases the processor is further programmed to, when a lens is mounted to the support structure, obtain at least one lens characteristic from a lens memory and use the flange focal distance error and the lens characteristic to generate the lens control signals to compensate for the flange focal distance error. Some embodiments further include a distance determiner for determining a target distance from the camera to a target to be imaged, the processor further programmed to use the target distance to generate the lens control signals to compensate for the flange focal distance error.

Still other embodiments include a method for use with a camera assembly for use in a machine vision system where the camera assembly includes a support structure forming a mounting flange that is configured for coupling with any of a plurality of exchangeable electrically controllable adjustable focal length lens assemblies, a two dimensional image sensor supported by the support structure and forming a two dimensional sensor plane spaced from the mounting flange by a flange focal distance and a processor, the method comprising the steps of during a commissioning procedure prior to normal operation of the camera, measuring a flange focal distance error which is the difference between an ideal flange focal distance and the flange focal distance and programming the processor to use the flange focal distance error to generate lens control signals to compensate for the flange focal distance error when a lens is mounted to the mounting flange for use with the assembly during normal operation of the assembly.

In some cases the camera assembly further includes a memory supported by the support structure, the step of programming including storing the flange focal distance error in the memory where the processor is programmed to retrieve the flange focal distance error from the memory. In some cases the flange focal distance error is determined using a first lens assembly during a commissioning procedure and is thereafter used during normal operation with at least a second lens assembly. In some cases the processor is further programmed to, when a lens assembly is mounted to the mounting flange, obtain lens characteristics from the lens assembly and use the lens characteristics to generate the lens control signals to compensate for the flange focal distance error.

In some cases the lens characteristics include an effective focal length associated with the lens assembly. In some cases the lens assembly mounted to the flange is a motorized lens assembly and the control signals cause the lens assembly to adjust by an amount equal to the flange focal distance error. In some cases the flange focal distance error is coded into software run by the processor to generate the lens control signals.

Other embodiments include a method for use with a camera assembly for use in a machine vision system where the camera assembly includes a support structure forming a mounting flange that is configured for coupling with any of a plurality of exchangeable electrically controllable adjustable focal length lens assemblies, a two dimensional image sensor supported by the support structure and forming a two dimensional sensor plane spaced from the mounting flange by a flange focal distance, a memory supported by the support structure and a processor, the method comprising the steps of during a commissioning procedure prior to normal operation of the camera, measuring a flange focal distance error which is the difference between an ideal flange focal distance and the flange focal distance, storing the flange focal distance error in the memory, programming the processor to retrieve the flange focal distance error from the memory and to use the flange focal distance error to generate lens control signals to compensate for the flange focal distance error when a lens is mounted to the mounting flange for use with the assembly during normal operation of the assembly.

In some cases the processor is further programmed to, when a lens is mounted to the support structure, obtain at least one lens characteristic from a lens memory and use the flange focal distance error and the lens characteristic to generate the lens control signals to compensate for the flange focal distance error. Some embodiments further include a distance determiner for determining a target distance from the camera to a target to be imaged, the processor further programmed to use the target distance to generate the lens control signals to compensate for the flange focal distance error.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
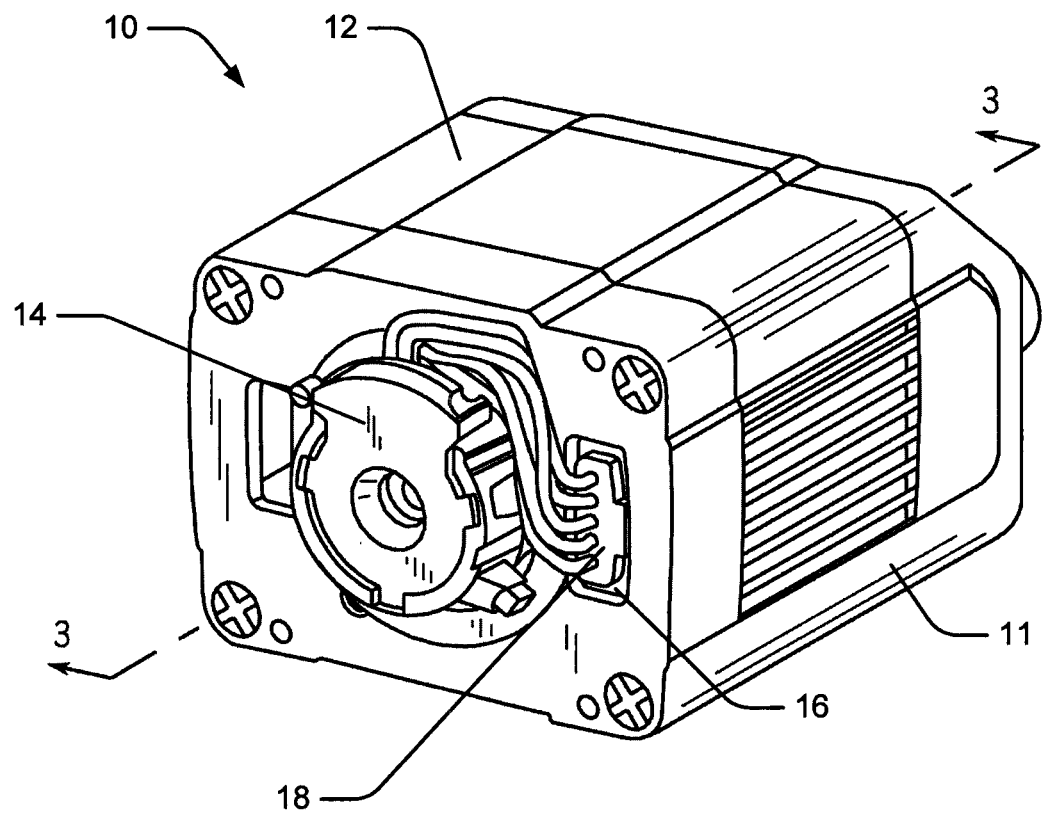
FIG. 1 is a perspective view a camera/lens assembly that is consistent with at least some aspects of the present invention.

One or more specific embodiments of the present invention will be described below. It should be appreciated that in the development of any actual implementation, as in any engineering or design project, numerous implementation-specific decisions must be made to achieve a developer's specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present invention will be described in the context of the exemplary camera/lens assembly 10 shown in FIGS. 1 through 3 and schematically in FIG. 4. Assembly 10 includes a camera subassembly 11 and a lens subassembly 14. Camera subassembly 11 includes a camera housing 12, a processing unit or processor 24 and an image sensor array 26. In the illustrated embodiment, the housing 12 is shown as several components that together form the housing structure. In other embodiments, other subsets of components may be combined to form the housing structure and in at least some cases, a single molded component may form the housing structure.

Figure 2:
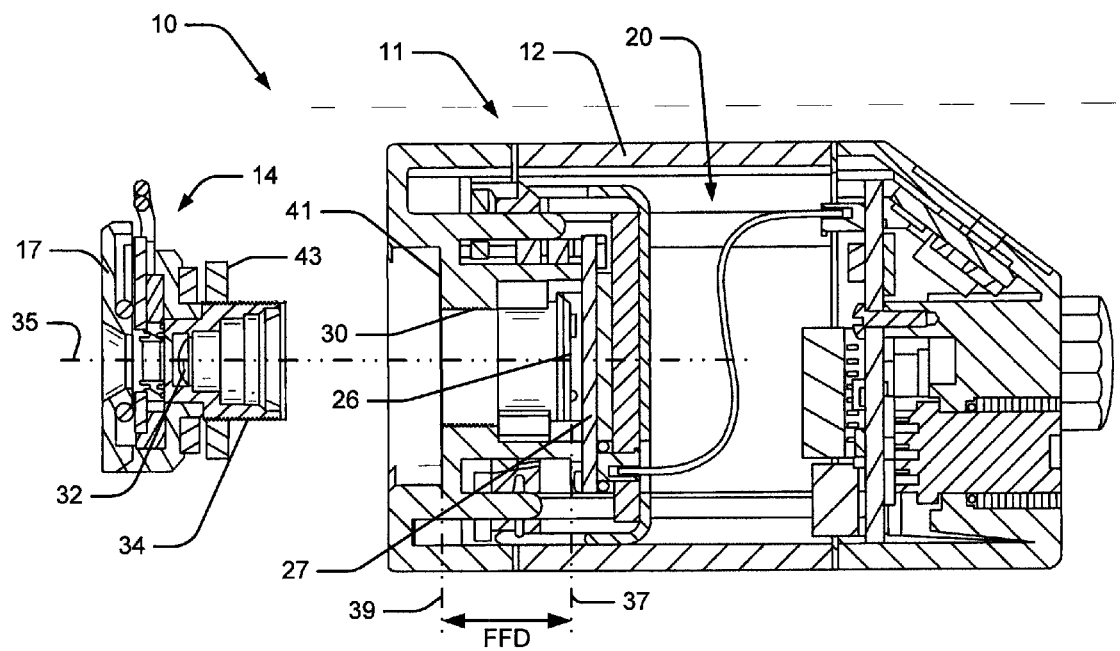
FIG. 2 is a partial cross-sectional view of the assembly shown in FIG. 1, albeit with a lens subassembly spaced apart from a camera subassembly.
Figure 3:
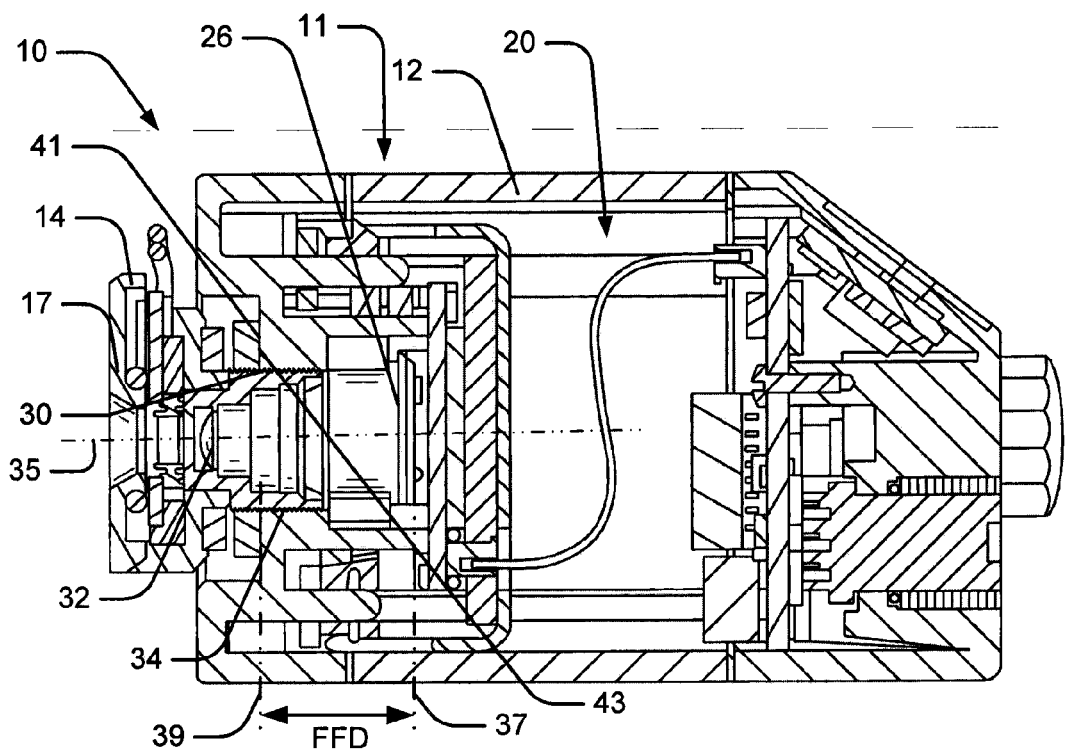
FIG. 3 is a similar to FIG. 2, albeit showing the lens subassembly mounted to the camera subassembly.

Referring still to FIGS. 1 through 4, housing 12 forms a housing cavity 20 that is generally open to one side (e.g., the left side as illustrated in FIGS. 2 and 3). Processor 24 (see FIG. 4) is mounted to a PCB 27 within cavity 20. Image sensor 26 includes a CCD, CMOS, or other type 2D planar sensor array which is mounted to a surface of a PCB 27 and the sensor/PCB assembly is mounted within cavity 20 so that the sensor 26 faces the open end of the cavity. The sensor 26 is arranged along a camera imaging axis 35. Referring to FIGS. 2 and 3, after installation, a sensing surface of image sensor 26 is located within a sensing plane 37. Image sensor 26 is linked to processor 24.

Referring still to FIGS. 2 and 3, housing 12 also forms a flange surface or flange 41 that faces out the open end of cavity 20 as well as a threaded female coupling opening 30 that opens into cavity 20 through flange surface 41. Opening 30 is symmetrically formed around imaging axis 35 and adjacent the sensing surface of image sensor 26. A flange focal distance (FFD) exists between the sensing plane 37 of image sensor 26 and the flange surface 39 as labeled in FIGS. 2 and 3.

Figure 4:
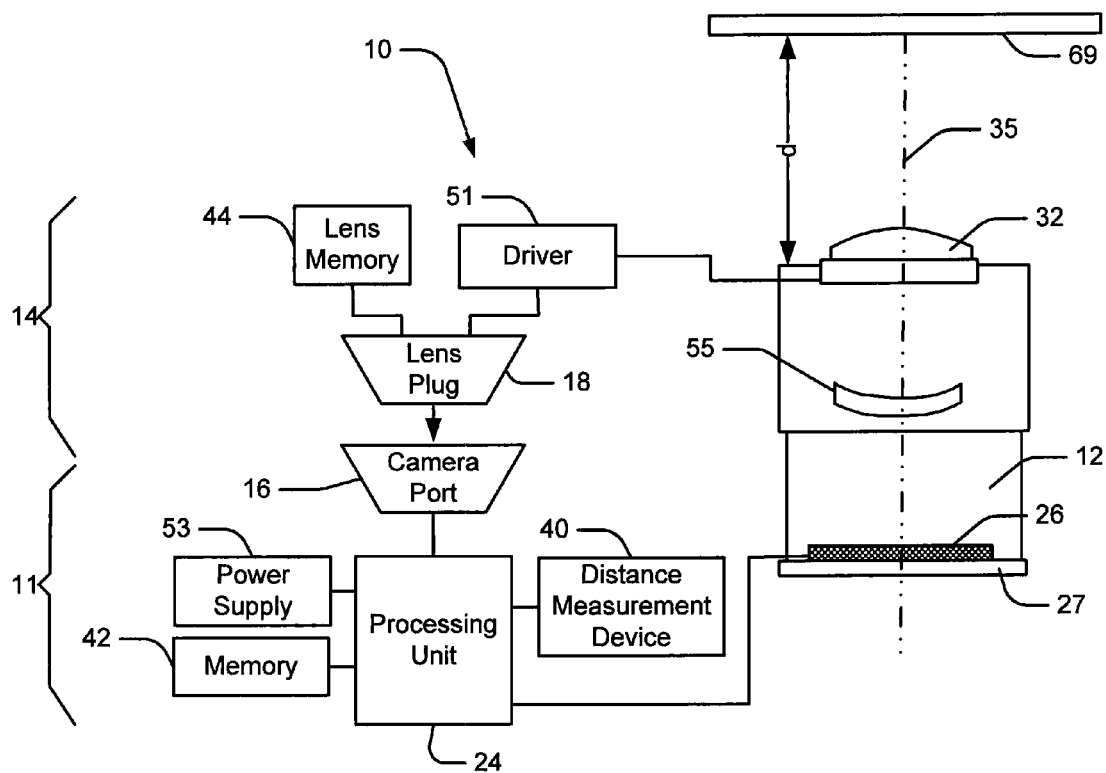
FIG. 4 is a schematic view illustrating the camera/lens assembly shown in FIG. 3.

Referring to FIGS. 1 and 4, camera subassembly 11 forms a female electrical coupler or port 16 adjacent coupling opening 30. Port 16 is designed to securely receive and mechanically couple to a male electrical plug member 14 that forms part of the lens subassembly 14 so that lens control signals can be transmitted from processor 24 to lens subassembly 14 and so that, in at least some embodiments, lens characteristics can be read by processor 24 from a lens memory.

Referring to FIG. 4, in addition to the components described above, camera subassembly 11 includes a power supply 53, a memory 42 and a distance measurement device 40. In at least some embodiments power supply 53 is a battery. Processor 24 is linked to power supply 53 to receive power there from. Processor 24 is also linked to memory 42. Algorithms performed by processor 24 to carry out methods that are consistent with at least certain aspects of the present invention are stored in memory 42. In addition, data required to perform inventive methods or processes is also stored in memory 42.

Distance measurement device 40 includes a device or subassembly that can be use to determine the distance between camera assembly 10 and a target surface to be imaged. Various distance measurement devices are well known in the art and therefore will not be described here in detail. Device 40 is linked to processor 24 to provide instantaneous camera to target distance values (see d in FIG. 4) to processor 24 during assembly operation. Although the embodiment described here includes measurement device 40 as part of camera assembly 10, device 40 may be provided separate from assembly 10.

Referring again to FIGS. 1 through 4, in at least some embodiments, lens subassembly 14 includes a lens support structure 17, a liquid lens assembly 32, a fixed glass imager lens 55 (or group of fixed lenses), a lens memory device 44 (see specifically FIG. 4), a driver 51 and the male electrical plug 18 (see specifically FIG. 1). Support structure 17 is typically formed of a rigid plastic material and, as the label implies, provides support for the other components that comprise lens subassembly 14. While structure 17 is shown as including several components in the illustrated example, in at least some embodiments, structure 17 may be formed of a different subset of components or even by a single component member. Each of the driver 51, memory 44, plug 18, imager lens 55 and liquid lens assembly 32 are supported by structure 17.

Structure 17 has other features for coupling lens subassembly 14 to camera subassembly 11 and that cooperate with features of the camera subassembly in an attempt to precisely position the lens subassembly components with respect to the camera components. To this end, referring again to FIGS. 3 and 4, support structure 17 forms a generally cylindrical passageway in which the fixed and liquid lenses are mounted along and aligned with an optical axis. An external surface of structure 17 forms a cylindrical threaded male coupling surface 34 designed to couple to the threaded female coupling opening 30 formed by camera housing 12. Structure 17 also forms a stop surface 43 that extends perpendicular to threaded surface 34 and that is designed to cooperate with flange surface 41 to limit the position of lens subassembly 14 with respect to camera subassembly 12 upon mounting.

Liquid lenses like lens 32 are well known in the art and therefore lens subassembly 32 will not be described here in detail. Here it should suffice to say that liquid lens 32 is a variable focus liquid lens assembly that includes a fluid chamber defined by two parallel windows facing each other, and a body to which the windows are fixed. The windows are preferably transparent plates formed of an optical transparent material such as glass. The fluid chamber contains two immiscible liquids of similar density and having different optical indices, which form an optical interface in the form of a meniscus. One of the liquids is preferably an insulating liquid, for example comprising oil and/or an oily substance, and the other is preferably a conductive liquid comprising, for example, an aqueous solution. The liquid lens also comprises a cap and a gasket that is sandwiched between the cap and the body ensuring the tightness of the lens structure. The conductive liquid is in contact with an electrode formed by the cap, and the liquid-liquid interface contacts a conical part of the body that comprises an insulated electrode. Through electrowetting phenomena it is possible to modify the curvature of the liquid-liquid interface, according to a voltage V applied between the electrodes formed by the cap and the body. For example, the curvature may change from a concave first shape to a relatively more concave second shape. Thus, a beam of light passing through the fluid chamber will be focused to a greater or lesser extent according to the applied voltage.

Referring to FIG. 4, an actuator (not shown) of liquid lens assembly 32 is electrically controlled by driver 51 that applies driving voltages such that the focal length of the optical lens assembly 14 can be changed in a controlled fashion. Driver 51 is linked to plug 18 so that driver 51 can receive control signals from processing unit 24 when plug 18 is connected to port 16 (see again FIG. 1). In at least some embodiments lens memory 44 is also electrically linked to plug 18 so that lens characteristics can be read by processor 24 when plug 18 is coupled to port 16.

Memory 44, in at least some embodiments, includes an Eeprom and is used to store various characteristics of the lens subassembly 14. For instance, in at least some embodiments memory 44 will store and effective focal length of the fixed lens 55 (see again FIG. 4). In addition, memory 44 may store slope and offset values that relate optical power of liquid lens 32 to applied voltage values required to change lens shape to produce different optical powers.

Referring again to FIG. 2, to mount lens subassembly 14 to camera subassembly 11, structure 17 is positioned to align the threaded surface 34 of the lens male coupler with the threaded surface of the camera housing female coupler 30 and is moved toward camera subassembly 11 until the threads engage. The lens subassembly 14 is rotated until stop surface 43 abuts flange surface 41. At this point surfaces 41 and 43 cooperate to position the components of assembly 14 in a specific juxtaposition with respect to the camera subassembly components. More specifically, surfaces 41 and 43 and other support structure of the lens subassembly and the housing 12 cooperate to position the lenses 55 and 32 along the imaging axis 35 (see also FIG. 3) and in an attempt to set the lenses 32 and 55 at known positions with respect to the sensing surface of image sensor 26.

The calculations performed by processor 24 to generate the liquid lens control signals for controlling lens assembly 32 are based on the presumption that lenses 32 and 35 are at precise positions with respect to sensor 26. Any variation in the juxtapositions between the lenses and sensor can therefore adversely affect ability to focus on a target surface (see 69 in FIG. 4) at a distance from the assembly 10. Thus, the flange focal distance FFD (see again FIGS. 2 and 3) is a particularly important dimension when manufacturing the camera subassembly 11.

As described above, for various reasons, the FFD is difficult to control during manufacturing so that an FFD error ($e_{FFD}$) often occurs which can adversely affect ability of camera assembly 10 to focus images of targets 69 on the sensing surface of sensor 26.

According to at least some embodiments of the present invention, to compensate for the $e_{FFD}$, the $e_{FFD}$ may be calculated for each camera subassembly 11 after manufacturing is complete and the $e_{FFD}$ may be stored in the camera memory 42 for use by processor 24 to compensate for the error. Then, during normal operation, after a lens subassembly is mounted to the camera subassembly 11, the processor may use the $e_{FFD}$ to control the variable focus lens subassembly to compensate for the $e_{FFD}$.

In the case of a liquid lens like lens 32, the manner in which lens control signals have to be altered to compensate for the $e_{FFD}$ depends on the effective focal length of the lens. As described above, many lens subassemblies that include a liquid lens come with the focal length of the lens stored in the lens memory 44 which can be read out by processor 24 upon lens mounting.

Regarding calculation of the lens control signals, the distance d at which a target is in focus for an exemplary camera assembly can be expressed by the following general equation:

$$1/d = LL_{op} + IL_{op} - 1/(FFD_i + e_{FFD}) \quad \text{Equation 1}$$

where $LL_{op}$ is the optical power of liquid lens 32, $IL_{op}$ is the optical power of imager lens 55, both expressed in diopters, $FFD_i$ is an ideal flange focal distance (i.e., the flange focal distance if there was no $e_{FFD}$) and $e_{FFD}$ is the flange focal distance error. The optical power $IL_{op}$ of the imager lens can be expressed as the inverse of the effective focal length of the imager lens as in equation 2:

$$IL_{op} = 1/e_{fl} \quad \text{Equation 2}$$

Equations 1 and 2 can be combined and rewritten to calculate a required optical power of the liquid lens 32 for focusing on a target at a specific distance d as follows:

$$LL_{op} = 1/d - 1/e_{fl} + 1/(FFD_i + e_{FFD}) \quad \text{Equation 3}$$

Effective focal length $e_{fl}$ is stored in liquid lens camera memory 44. The flange focal distance error $e_{FFD}$ is measured after manufacture and stored in camera memory 42. In addition, camera subassembly 11 is of a specific type (e.g., C-mount, CS-mount, etc.) and therefore is characterized by an ideal flange focal distance $FFD_i$ which can be programmed into the algorithm performed by processor 24. Thus, when camera to target distance d is measured via distance measurement device 40 and is provided to processor 24, processor 24 can calculate the liquid lens optical power $LL_{op}$ required for focusing on the target at distance d by reading the effective focal distance and flange focal distance error from memories 44 and 42, respectively, and solving equation 3. Once optical power $LL_{op}$ is determined, processor 24 generates control signals that are provided to lens driver 51 to specify the liquid lens optical power required to focus at distance d. In at least some embodiments the control signals are provided as PWM signals although other control signal types are contemplated.

Referring still to FIG. 4, driver 51 is programmed with various liquid lens parameters that enable driver 51 to control liquid lens 32 to adjust the optical power of lens 32 to match the power value calculated using equation 3. To this end, as well known in the industry, lens 32 is characterized by a slope and an offset value that relate optical power to the voltage level applied across the lens. The slope and offset are determined for the lens and are stored in the lens memory 44 for use by driver 51. Driver 51 provides the voltage to the lens actuator to control the liquid lens optical power.

After manufacture of a camera assembly 11, any of various methods may be used to measure the flange focal distance error $e_{FFD}$. For instance, in at least some cases a liquid lens may be mounted to a camera for which error $e_{FFD}$ is to be measured and a target may be located a known distance from the camera assembly. The processor may calculate an optical power $LL_{op}$ for the liquid lens by solving Equation 3 with the known distance d and assuming a zero flange focal distance error $e_{FFD}$. The camera assembly may be controlled to obtain target images while changing the $e_{FFD}$ value in equation 3 to thereby change the optical power of the liquid lens until a sharply focused image results. The error $e_{FFD}$ corresponding to the focused image may then be stored in the camera memory 42 for subsequent use with other lenses.

As another instance, a liquid lens may be mounted to a first camera that is known to have an ideal flange focal distance $FFD_i$ and the first camera/lens assembly may be positioned with respect to a target so that a resulting image is sharp with the liquid lens set to a specific optical power. A first distance between the first camera/lens assembly and the target is measured when the image is sharp. Next, without changing the focus settings on the lens, the lens is mounted to a second camera for which the $e_{FFD}$ is to be determined. The second camera/lens assembly is moved with respect to the target until a sharp image results and a second camera/lens to target distance is measured. The known effective focal length and difference between the first and second distances can be used to calculate the error $e_{FFD}$ (e.g., by solving a version of equation 3) which is then stored for subsequent use.

Figure 5:
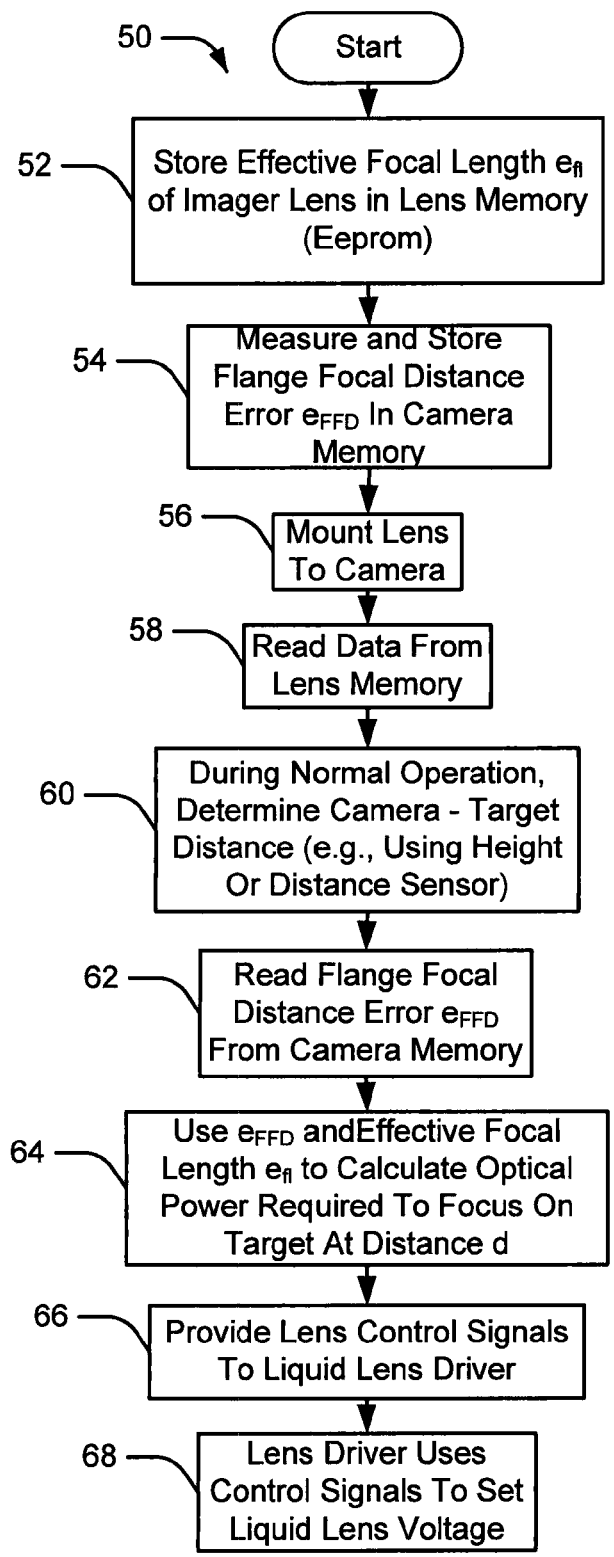
FIG. 5 is a flow chart illustrating a process for use with a liquid lens subassembly that is consistent with at least some aspects of the present invention.

Referring now to FIG. 5, a flow chart 50 is illustrated that shows a method that is consistent with at least some aspects of at least some embodiments of the present invention. Referring also to FIG. 4, at block 52, the effective focal length $e_{fl}$ of the imager lens 55 is stored in lens memory 44. In addition, although not illustrated in FIG. 5, the slope and offset values associated with the optical power and lens voltage relationship that are used by driver 51 to control the liquid lens are also stored at block 52. At block 54, the flange focal distance error $e_{FFD}$ is measured after a camera assembly has been manufactured and is stored in camera memory 42. At block 56, any of a plurality of different liquid lens assemblies (e.g., see exemplary assembly 14 in FIG. 2) is mounted to camera subassembly 11. In at least the illustrated embodiment, mounting includes mechanical mounting of lens subassembly 14 to the camera subassembly 11 as well as reception of plug 18 in port 16 to form an electrical connection between processor 24 and driver 51 as well as a data communication link between lens memory 44 and processor 24.

Referring still to FIG. 5, after a lens subassembly 14 is mounted to camera subassembly 11, processor 24 reads data from the lens memory. In the embodiment described above, processor reads the effective focal length $e_{fl}$ value from memory 44. At block 60, during normal operation when the camera/lens assembly 10 is used to obtain an image of a target (see 69 in FIG. 4) at a distance d, at block 60, distance measurement device 40 first determines the camera to target distance d and provides value d to processor 24. At block 62, processor 24 reads flange focal distance error $e_{FFD}$ from camera memory 42. At block 64, processor 24 uses the flange focal distance error $e_{FFD}$, the effective focal length $e_{fl}$ and the measured distance d from block 60 to calculate the liquid lens optical power required to focus an image of the target at distance d on sensor 26 (see again FIG. 4). At block 66, processor 24 generates and provides lens control signals to liquid lens driver 51 indicating the required optical power. At block 68, driver 51 uses the control signals as well as the slope and offset values associated with liquid lens 32 to set the liquid lens voltage at a level calculated to result in the required optical power.

In at least some embodiments, it is contemplated that, instead of a liquid lens subassembly, a motorized lens subassembly may be used with a camera subassembly 11 as described above. Where a motorized lens assembly is employed, a flange focal distance error as described above has similar effect on the ability of a camera assembly to focus on a target. In the case of a motorized lens subassembly, a flange focal distance error can be compensated without obtaining any information such as the effective focal distance from the lens subassembly. Instead, processor 24 can be programmed to simply adjust control of a motorized lens by an amount equal to the flange focal distance error but in an opposite direction thereby moving the motorized lens assembly along the imaging axis 35. For example, referring again to FIG. 2, where an actual flange focal distance FFD is 250 microns greater than an ideal flange focal distance FFD$_i$ so that the flange focal distance error e$_{FFD}$ is +250 microns, processor 24 can be controlled to simply adjust a motorized lens subassembly to move the subassembly lenses along imaging axis 35 by 250 microns toward image sensor 26 to directly compensate for the error. Similarly, where the flange focal distance error is −250 microns, processor 24 can be programmed to move the lenses in the lens subassembly away from image sensor 26 by 250 microns along axis 35.

Referring again to FIG. 4, in the case of a camera assembly including a motorized lens, the FIG. 4 schematic would not include lens memory 44 and the liquid lens 32 and fixed lens 55 would be replaced by a motorized lens assembly driven by a suitable driver 51.

Figure 6:
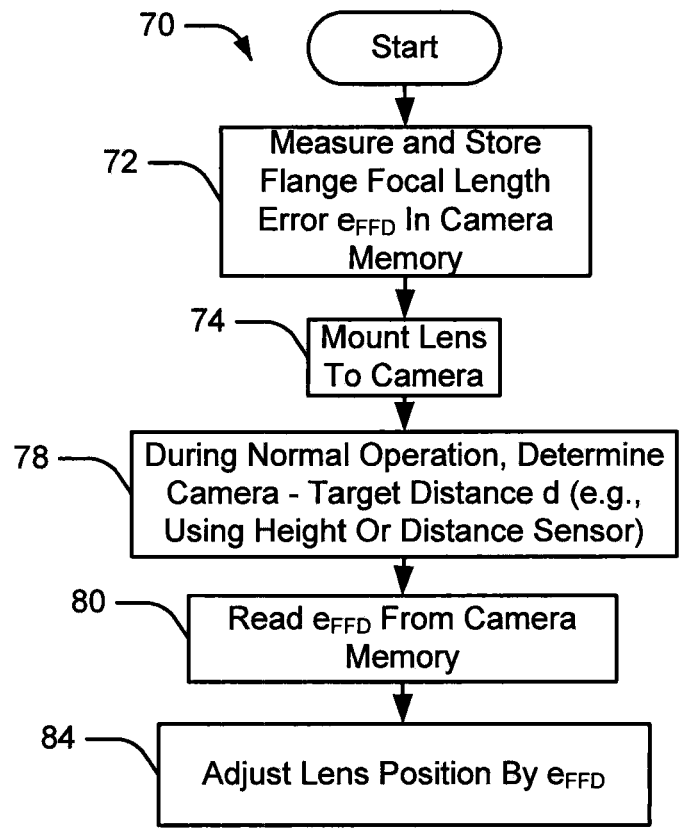
FIG. 6 is a flow chart illustrating a process for use with a motorized lens subassembly that is consistent with at least some aspects of the present invention.

Referring now to FIG. 6, an exemplary method 70 is illustrated that may be used to compensate for a flange focal distance error when a motorized lens subassembly is mounted to a camera subassembly 11. Referring also to FIG. 4, at block 72, a flange focal distance error e$_{FFD}$ for a camera is measured and stored in camera memory 42. At block 72 a motorized lens subassembly is mounted to the camera subassembly. At block 78, during normal operation, when an image of a target at a distance d is to be obtained, distance measurement device 40 is used to determine distance d between camera subassembly 11 and the target 69. At block 80, processor 24 reads the flange focal distance error e$_{FFD}$ from memory 42. At block 84, processor 24 adjusts the lens position by the flange focal distance error e$_{FFD}$ and a function of distance d to compensate for the error.

While the invention may be susceptible to various modifications and alternative forms, specific embodiments have been shown by way of example in the drawings and have been described in detail herein. However, it should be understood that the invention is not intended to be limited to the particular forms disclosed. For example, while the processor for controlling the lenses in the above examples is mounted to the camera housing, it should be appreciated that the processor could be mounted directly to a lens or within a lens housing. In this case, when a lens is connected to a camera subassembly, the lens based processor may read the flange focal distance error from the camera memory and perform one of the above processes. As another example, in the case of a liquid lens, other lens characteristics such as the slope and offset values that define the voltage and optical power relationship may be read along with an effective focal distance from a lens memory by a camera processor and the processor may generate a lens voltage signal as opposed to the control signals to affect the required optical power.

As still one other example, while the embodiments described above include a camera memory in which a measured flange focal distance error is stored after manufacture and prior to normal operation of the camera assembly, in other embodiments, after the flange focal distance error is calculated, equation 3 may be modified to reflect the error so that the error is, in effect, programmed into the software run by processor 24. Thus, the last factor in equation 3 above may collapse into a constant value as, after the error is calculated, both the ideal flange focal distance FFD$_i$ and the error e$_{FFD}$ would be known. In this way memory 42 in FIG. 4 could be eliminated as the error e$_{FFD}$ would be coded directly into the software run by processor 24.

Thus, the invention is to cover all modifications, equivalents, and alternatives falling within the spirit and scope of the invention as defined by the following appended claims.

To apprise the public of the scope of this invention, the following claims are made:

What is claimed is:

1. A camera assembly for use in a machine vision system, the assembly comprising:
   a support structure forming a mounting flange that is configured for coupling with any of a plurality of exchangeable electrically controllable adjustable focal length lens assemblies;
   a two dimensional image sensor supported by the support structure and forming a two dimensional sensor plane spaced from the mounting flange by a flange focal distance;
   a memory supported by the support structure, the memory storing a flange focal distance error prior to normal operation of the camera assembly wherein the flange focal distance error is the difference between an ideal flange focal distance and the flange focal distance;
   a processor programmed to, when a first lens assembly including an imager lens and a liquid lens is mounted to the mounting flange, generate lens control signals to compensate for the flange focal distance error based upon: calculating an optical power for the liquid lens, for focusing on a target to be imaged, based upon an effective focal length of the imager lens, a target distance from the camera assembly to the target, and the flange focal distance error stored in the memory.

2. The camera assembly of claim 1 wherein the processor is supported by the support structure that forms the mounting flange.

3. The camera assembly of claim 1 wherein the processor is supported by the first lens assembly and obtains the focal distance error from the memory after the first lens assembly is mounted to the mounting flange.

4. The camera assembly of claim 1 wherein the flange focal distance error is determined during a commissioning procedure using a second lens assembly that is different from the first lens assembly.

5. The camera assembly of claim 1 further including electrical contacts adjacent the mounting flange and linked to the processor, the contacts adjacent the mounting flange being for linking to contacts on the first lens assembly when the first lens assembly is mounted to the mounting flange to provide the lens control signals to the first lens assembly.

6. The camera assembly of claim 5 wherein the processor is further programmed to, when the first lens assembly is mounted to the mounting flange, obtain at least one lens characteristic from the first lens assembly and use the at least one lens characteristic to generate the lens control signals to compensate for the flange focal distance error.

7. The camera assembly of claim 6, further including a distance determiner for determining the target distance from the camera assembly to the target;
   wherein the at least one lens characteristic includes the effective focal length of the imager lens; and
   wherein the processor is further programmed to control a lens driver for the liquid lens to provide the calculated optical power for the liquid lens.

8. The camera assembly of claim 1 wherein the first lens assembly is a part of a motorized lens assembly.

9. The camera assembly of claim 1 wherein the flange focal distance error is coded into software run by the processor to generate the lens control signals.

10. A camera assembly for use in a machine vision system, the assembly comprising:
   a support structure forming a mounting flange that is configured for coupling with any of a plurality of exchangeable electrically controllable adjustable focal length lens assemblies;
   a two dimensional image sensor supported by the support structure and forming a two dimensional sensor plane spaced from the mounting flange by a flange focal distance;
   a memory supported by the support structure and storing a flange focal distance error prior to normal operation of the camera assembly and for use thereafter with multiple adjustable focal length lens assemblies wherein the flange focal distance error is the difference between an ideal flange focal distance and the flange focal distance; and
   a processor programmed to obtain the flange focal distance error from the memory and to use the flange focal distance error to generate lens control signals to compensate for the flange focal distance error, when a first lens assembly including an imager lens and a liquid lens is mounted to the mounting flange, based upon:
   calculating an optical power for the liquid lens, for focusing on a target to be imaged, based upon an effective focal length of the imager lens, a target distance from the camera assembly to the target, and the flange focal distance error stored in the memory.

11. The camera assembly of claim 10 wherein the processor is supported by the support structure that forms the mounting flange.

12. The camera assembly of claim 10 wherein the processor is supported by the first lens assembly.

13. The camera assembly of claim 11 wherein the processor is further programmed to obtain at least one lens characteristic from a lens memory of the first lens assembly when the first lens assembly is mounted to the support structure, the at least one lens characteristic including the effective focal length of the imager lens.

14. The camera assembly of claim 10 further including a distance determiner for determining the target distance from the camera to the target.

15. A method for use with a processor, a memory, and a camera assembly for use in a machine vision system where the camera assembly includes a support structure forming a mounting flange that is configured for coupling with any of a plurality of exchangeable electrically controllable adjustable focal length lens assemblies, and a two dimensional image sensor supported by the support structure and forming a two dimensional sensor plane spaced from the mounting flange by a flange focal distance, the plurality of exchangeable electrically controllable adjustable focal length lens assemblies including a first lens assembly having an imager lens with an effective focal length and a liquid lens, the method comprising the steps of:
   during a commissioning procedure prior to normal operation of the camera assembly, measuring a flange focal distance error which is the difference between an ideal flange focal distance and the flange focal distance, and storing the flange focal distance error in the memory; and
   programming the processor to, when the first lens assembly is mounted to the mounting flange, generate lens control signals to compensate for the flange focal distance error based upon:
   calculating an optical power for the liquid lens, for focusing on a target to be imaged, based upon the effective focal length of the imager lens, a target distance from the camera assembly to the target, and the flange focal distance error stored in the memory.

16. The method of claim 15 wherein the memory is supported by the support structure.

17. The method of claim 15 wherein the flange focal distance error is determined during the commissioning procedure using a second lens assembly that is different from the first lens assembly.

18. The method of claim 15 wherein the processor is further programmed to, when the first lens assembly is mounted to the mounting flange, obtain at least one lens characteristic from the first lens assembly and use the at least one lens characteristic to generate the lens control signals to compensate for the flange focal distance error.

19. The method of claim 18 wherein the at least one lens characteristic includes the effective focal length of the imager lens.

20. The method of claim 15 wherein the first lens assembly is a part of a motorized lens assembly.

21. The method of claim 15 wherein the flange focal distance error is coded into software run by the processor to generate the lens control signals.

22. The method of claim 15 wherein the memory is included in the camera assembly and is supported by the support structure.

23. The method of claim 22 wherein the processor is further programmed to obtain the effective focal length of the imager lens from a lens memory of the first lens assembly when the first lens assembly is mounted to the support structure.

24. The method of claim 15, wherein the camera assembly includes a distance determiner for determining the target distance from the camera to the target, the method further comprising the steps of programming the processor to obtain the target distance from the distance determiner.

* * * * *